United States Patent [19]

Harlos et al.

[11] Patent Number: 5,406,336
[45] Date of Patent: Apr. 11, 1995

[54] CONTRAST AND BRIGHTNESS CONTROL WHEREBY BOTH ARE BASED ON THE DETECTED DIFFERENCE BETWEEN A FIXED BLACK LEVEL IN THE VIDEO SIGNAL AND THE BLACK PEAK VALUE

[75] Inventors: Hartmut Harlos; Klaus Kröner, both of Hamburg; Matthias Peters, Neu Wulmstorf; Jörg Wölber, Pinneberg-Thesdorf, all of Germany

[73] Assignee: U.S. Philips Corporation, New York, N.Y.

[21] Appl. No.: 156,488

[22] Filed: Nov. 23, 1993

[30] Foreign Application Priority Data

Nov. 24, 1992 [DE] Germany ............... 42 39 365.5

[51] Int. Cl.⁶ .............. H04N 9/72; H04N 9/64; H04N 9/68
[52] U.S. Cl. .................. 348/673; 348/689; 348/691; 348/698
[58] Field of Search ......... 348/379, 673, 687, 689, 348/690, 691, 692, 695, 696, 698; H04N 9/72, 9/64, 9/68

[56] References Cited

U.S. PATENT DOCUMENTS

| | | | |
|---|---|---|---|
| 3,947,631 | 3/1976 | Rhee et al. | 178/7.3 |
| 3,970,777 | 7/1976 | Bradford et al. | 348/691 X |
| 4,204,229 | 5/1980 | Heuze. | |
| 4,369,466 | 1/1983 | Matsuzaki et al. | 348/691 X |

FOREIGN PATENT DOCUMENTS

| | | |
|---|---|---|
| 0091868 | 10/1983 | European Pat. Off. . |
| 3430593 | 3/1985 | Germany ............ H04N 5/16 |
| 3714861 | 11/1988 | Germany . |
| 2010634 | 6/1979 | United Kingdom . |

*Primary Examiner*—James J. Groody
*Assistant Examiner*—John W. Miller
*Attorney, Agent, or Firm*—Edward W. Goodman

[57] ABSTRACT

A circuit arrangement for processing an input video signal (V) is described, which video signal has a fixed black level (SP), a given white peak value (WW) as well as a black peak value (SW) dependent on the picture contents (during tb), in which a correct display of the blackest and brightest parts of the picture contents of the video signal (V) is rendered possible without many components and without interference. To this end the circuit arrangement includes a detection device (1) for detecting the difference between the fixed black level (SP) in the video signal (V) and the black peak value (SW) detected in the picture contents (during tb) of the video signal (V), a level shifting device (6) for forming a black value-corrected video signal (V') by shifting the level of the picture contents of the video signal (V) by the detected difference towards the black level (SP), and an amplitude steering device (8) for forming an amplitude-corrected video signal (V'') by correcting the amplitude of the picture contents (during tb) of the black value-corrected video signal (V') in accordance with an amplitude steering signal obtained from the detected difference such that the amplitude-corrected video signal (V'') has the same given white peak value (WW) as the input video signal (V).

10 Claims, 2 Drawing Sheets

CONTRAST AND BRIGHTNESS CONTROL WHEREBY BOTH ARE BASED ON THE DETECTED DIFFERENCE BETWEEN A FIXED BLACK LEVEL IN THE VIDEO SIGNAL AND THE BLACK PEAK VALUE

BACKGROUND OF THE INVENTION

Field of the Invention

The invention related to a circuit arrangement for processing a video signal.

Processing a video signal in a television receiver is subjected to various conditions by which a faultless reproduction of the picture contents of the video signal in a picture display device, for example a display tube, is to be ensured. One of the measures of ensuring a correct display is to clamp a fixed black level in the video signal at a predetermined value. By means of this clamping, a DC level, which is not transmitted from the transmitter to the television receiver, is introduced into the video signal in such a way that a correct separation of synchronizing signals contained in the video signal is possible, and that it is used for adjusting the signal levels required for controlling the picture display device, particularly for adaptation to the cut-off point of the display tube. It is also known to control the amplitude of the video signal so that the picture contents can be displayed with the correct brightness. Since the amplitude control of the video signal is to be independent of the picture contents, to avoid fluctuations in the control of brightness and contrast of the displayed picture with changes in the picture contents, the control information is only derived from the synchronizing signals. In conjunction with the operation of clamping the video signal, a predetermined white peak value is then determined for the video signal which assumes this value at those areas in the picture that represent the whitest picture contents to be displayed.

However, the blackest parts of the picture contents may assume signal values which deviate from the fixed black level to an unforeseeable extent. If the dark control of the picture display device, for example, the cut-off point of the display tube, is adjusted only at the fixed black level (also referred to as black porch) in the video signal, inadmissible bright parts are also obtained in the displayed picture in parts which are to be displayed as black pans. For a correct picture display, it is therefore also necessary to correct the video signal to such an extent that the blackest picture parts are always displayed as black pans, but that also the brightest picture parts are always displayed as bright or white parts.

DESCRIPTION OF THE RELATED ART

An automatic video signal control circuit for a television receiver is known from U.S. Pat. No. 3,947,631, in which the video signal has a black level which is derived from the black peak value of the picture contents and which has a white level generated from the combination of a mean white value and a white peak value in the picture contents. This control circuit comprises two interlinked control circuits, viz. a black control and a white control by which the darkest and brightest parts of the picture contents are determined via peak detectors or additionally via an averaging circuit, and their levels are corrected for predetermined nominal values. In this case both control loops act on one and the same video signal amplifier.

A circuit for restoring the black level is known from DE-A-34 30 593, in which the dark, or black signal component below a predetermined level of a video signal is changed in such a way that a dark or black peak level is made to conform with a black level by means of a feedback control. A signal component above the predetermined level at the side of the white level is not changed by this black level restoration so that a stable color display and a stable brightness which are not influenced by this black level restoration should be ensured.

A method and device for preparing video signals for enhancing the picture contrast are known from DE-A-37 14 861. In a first step, both the minimum and the maximum value of a picture information component are determined from a video signal having a given duration in a part of the circuit intended for this purpose. In a second step, a mean value is formed between the determined minimum and maximum values in a part of the circuit, by which a DC level is applied to the video signal of the predetermined duration. In a third step, and essentially simultaneously with the second step, a differential value is determined between the minimum and maximum values in a further part of the circuit, which value, used as a rating value for the amplification, finally realizes the ultimate amplification of the video signal in an amplifier circuit.

An arrangement for contrast expansion in a video signal is known from GB-A-2,010,634, corresponding to U.S. Pat. No. 4,204,229, by which a video signal, which is provided for picture display and varies within a limited amplitude range, can be expanded to a wider contrast range which can be defined between two adjustable potentials for the video signal. Incorporated in the signal path for the video signal, this arrangement comprises a first circuit for adjusting the video signal to a first potential and an automatic gain control circuit which precedes the first circuit in the signal path for the video signal and which receives the output signal from this first circuit so as to perform a complementary adjustment at the second potential. Both the first circuit and the automatic gain control circuit comprise a control loop each. Each control loop has a time constant which preferably corresponds to a picture period and with which the current changes in the minimum and maximum values of the video signal are determined.

The same principle is also used in a video signal processing circuit known from EP-B-91 868, which includes a circuit for automatic contrast expansion adjusting the current amplitude of the video signal between predetermined lower and upper reference voltages. This is also realized in a control loop by which the variable gain of an amplifier is set for the video signal. The current minimum values of the picture contents are adjusted to a predetermined lower reference voltage in a kind of clamping circuit. Additionally, a window generator is provided by which this contrast expansion is effective only during a predeterminable picture section.

The known circuit arrangements have various drawbacks. For example, the arrangement known from U.S. Pat. No. 3,947,631 has two interlocking control loops whose construction and adjustment are elaborate and sensitive to interference. However, in the circuit arrangement known from DE-A-34 30 593, a transmission characteristic is adapted to the current black peak level of the video signal to be processed in a given control range proximate to a black level. This results in a nonlinear transmission of the picture contents of the video signal, which may lead to distortions in the display of the video picture.

In the circuit arrangement described in DE-A-37 14 861, the current signal contents, i.e. the picture contents of the video signal is constantly expanded to a predetermined, larger range of values. The starting point is a constantly changing mean value between a constantly measured maximum signal value and a minimum signal value which is also measured constantly. In practice, this results in large fluctuations of the brightness control of the video signal, which fluctuations are dependent on the picture contents.

GB-A-2,010,634, corresponding to U.S. Pat. No. 4,204,229, also comprises two interlocked control loops and expands the video signal in such a way that the current minimum and maximum values always cover predetermined boundary values of a predetermined contrast range. Also in this case brightness and contrast controls fluctuate with the picture contents to a considerable extent. The same also holds true for the circuit arrangement known from EP-B-91 868.

SUMMARY OF THE INVENTION

It is, inter alia, an object of the invention to provide a circuit arrangement for processing a video signal in which a correct display of the blackest and whitest parts of the picture contents of the video signal is realized without the drawbacks described hereinbefore. More specifically, this circuit arrangement should have a simple construction and a reliable operation.

To solve this object, the circuit arrangement for processing an input video signal according to the invention, having a fixed black level, a given white peak value as well as a black peak value dependent on the picture contents, comprises
- a detection device for detecting the difference between the fixed black level in
- the video signal and the black peak value detected in the picture contents of the video signal,
- a level shifting device for forming a black value-corrected video signal by shifting the level of the picture contents of the video signal by the detected difference towards the black level, and
- an amplitude steering device for forming an amplitude-corrected video signal by correcting the amplitude of the picture contents of the black value-corrected video signal in accordance with an amplitude steering signal obtained from the detected difference such that the amplitude-corrected video signal has the same given white peak value as in the input video signal.

Thus, a circuit arrangement according to the invention always realizes a correct picture display in which the blackest parts of the picture contents are actually displayed as "black" and the brightest picture parts remain unchanged. The impression of the picture is thus always rich in contrast without brightness distortions occurring. The circuit arrangement according to the invention operates in accordance with the principle of signal steering for which no control loops, i.e. no feedbacks are used. This precludes the possibility of interference due to a tendency towards oscillations. Moreover, the circuit arrangement according to the invention has a simple construction and can be combined without any problem with other conventional video signal processing devices.

In a circuit arrangement according to the invention, the picture contents of the input video signal are preferably shifted by the level shifting device towards the black level only when the black peak value detected in the picture contents of the video signal exceeds the black level towards the white peak value. Thus, the picture contents of the video signal are subjected to the correction according to the invention only when its blackest parts are brighter than the fixed black level, for example the black porch. There is no shift when the black peak value is "blacker" than the black level, because this would lead to a decrease of the picture contrast while the white peak value occurring in the video signal would be maintained, so that the picture impression would worsen.

The circuit arrangement according to the invention may particularly include a limiting circuit for supplying a limited difference value instead of the difference detected in the detection device, in so tar as this difference exceeds a predeterminable limit value. The limited differential value is preferably identical to the predeterminable limit value, but it should be taken into account that a scaling factor may occur between these two values, which factor is particularly to be taken into account when the detection device includes a video signal expansion circuit by which a predeterminable range of video signal values is expanded for detecting the black peak value. Such a video signal expansion circuit particularly amplifies, i.e. expands, exactly that control range of the video signal overproportionally within which the black peak value of the video signal should occur so as to be completely shifted to the predetermined black level by means of the circuit arrangement according to the invention. To perform this shift as exactly as possible, the black peak value and hence the difference with the black level can be obtained more exactly by means of the expansion described. However, if the black peak value fluctuates above this predetermined limit value, beyond which a complete shift of the black peak value to the black level for avoiding a distorted picture content is no longer desirable, it is no longer necessary to detect the difference exactly so that an expansion of the video signal to be measured does not provide advantages to the same extent.

In a further embodiment of the circuit arrangement according to the invention the detection device includes a memory for storing the value of the detected difference. This memory can be rewritten at each change of the field or at each change of the frame in the video signal, but in a corresponding manner, a difference once detected can also be retained for various successive frames or fields of the video signal. The detected difference and hence the shift of the level of the picture contents of the video signal as well as the amplitude control may optionally be used either for a rapid correction of fluctuations of the black peak value, or a mean value determined over a longer period of time may be used.

The detection device advantageously comprises a black peak detection stage which, when used with a video signal expansion circuit, is preferably combined with this circuit. The black peak value detected by the black peak value detection stage can then easily be used for forming the difference with the fixed black level.

Particularly when a video signal expansion circuit is used, it is also advantageous that the level shifting device comprises a stage for generating a shift signal which is applied as a control signal to a superposition stage for shifting the level of the picture contents of the video signal in the level shifting device. The scaling factor introduced by the video signal expansion circuit can then be easily compensated. A corresponding compensation at the correction of the amplitude of the picture contents can be realized in that the amplitude control device comprises a stage for generating the amplitude control signal which is applied to an amplitude control stage for correcting the amplitude of the picture contents.

The circuit arrangement according to the invention can be preferably combined with an amplitude control device for controlling the amplitude of the video signal applied to the detection device as well as with a clamping circuit for clamping the fixed black level in the video signal applied to the detection device at a predeterminable value. While the amplitude control device, for example implemented as an automatic gain control, can supply a given amplitude of the overall video signal and hence a white peak value, the clamping circuit adjusts the fixed black level, preferably the black porch, at a predeterminable value in such a way that the further processing of the video signal will be possible with defined signal levels, also in the circuit arrangement according to the invention.

These and other aspects of the invention will be apparent from and elucidated with reference to the embodiments described hereinafter.

DESCRIPTION OF THE PREFERRED EMBODIMENT

Figure 1:
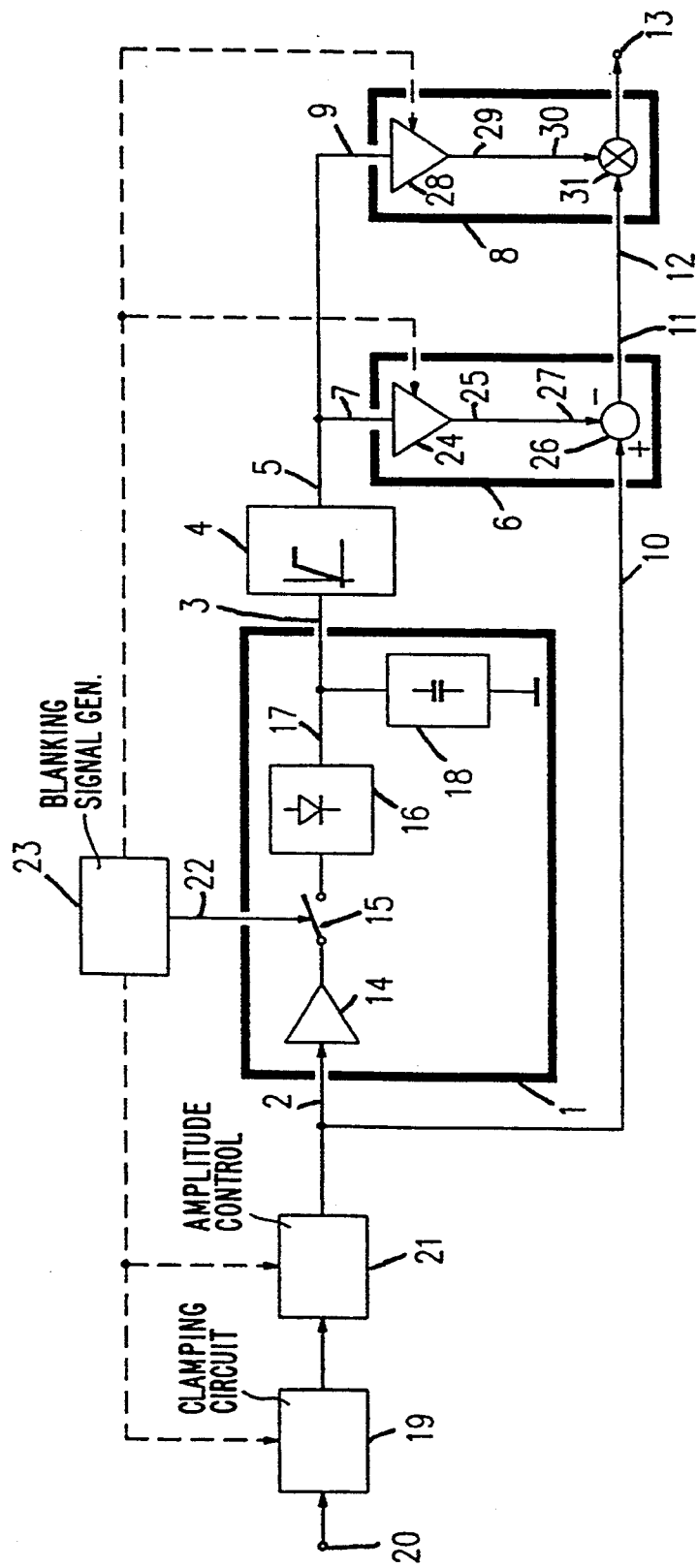
FIG. 1 is a block diagram of an embodiment of the invention.

The circuit arrangement of FIG. 1 comprises a detection device 1 having an input 2 for applying a video signal and an output 3 for supplying a signal corresponding to the difference between a fixed black level in the video signal and a signal corresponding to a black peak value detected in the picture contents of the video signal. This signal is applied from the output 3 via a limiting circuit 4 whose output 5 supplies the signal from the output 3, which signal corresponds to the detected difference, in so far as this difference does not exceed a predeterminable limit value. In the opposite case, a limited difference value is supplied from the output 5.

The signal from the output 5 of the limiting circuit 4 is applied to an input 7 of a level shifting device 6 and to an input 9 of an amplitude control device 8.

The video signal applied to the input 2 of the detection device 1 is also applied to a video signal input 10 of the level shifting device. In the level shifting device 6, a black value-corrected video signal is formed from this video signal, which black value-corrected video signal is supplied from an output 11 of the level shifting device 6. The amplitude control device 8 receives this black value-corrected video signal via a video signal input 12. In the amplitude control device 8, an amplitude-corrected video signal is formed from the black value-corrected video signal by means of correcting the amplitude of the picture contents, and this amplitude-corrected video signal is supplied from an output 13.

For performing the function of the circuit arrangement of FIG. 1, which function has roughly been explained in the foregoing, the detection device 1 includes a video signal expansion circuit 14. In the simplest case it comprises essentially an amplifier arrangement by which a predeterminable range of video signal values is amplified at a larger gain factor than the other video signal outside this range of values. Within this range of video signal values the video signal expansion circuit should preferably have a possibly ideal transmission behaviour. Under these conditions, a detection of the black peak value is accurately possible.

The video signal applied from the input 2 of the detection device 1 via the video signal expansion circuit 14 is subsequently applied via a blanking switch 15 of a black peak detection stage 16. This stage supplies a signal corresponding to the black peak value from its output 17, which signal is applied to a memory 18 and is simultaneously available at the output 3 of the detection device 1. In the simplest case the black peak detection stage 16 and the memory 18 are formed by a combination of a rectifier arrangement and a capacitor.

The embodiment described hereinbefore utilizes the fact that the detected black peak value at the output 17 directly corresponds to the difference between the fixed black level in the video signal and the black peak value. This is achieved in that the described circuit arrangement is connected to a clamping circuit 19 for clamping the fixed black level in the video signal. This clamping circuit 19 receives the video signal via an input 20, which video signal is made available, for example by a television receiver arrangement (antenna, tuner, alemodulator). This video signal at the output 20 initially does not have a defined DC level and is thus clamped at a predeterminable value with the fixed black level, i.e., for example the black porch which, relatively to the other contents of the video signal, occupies a defined position. For the subsequent video signal processing operation the fixed black level, which now also has a fixed, absolute value, can then be used as a reference level. This reference level will then also be used as a reference level for the detected black peak value in the detection device so that its detected value directly corresponds to the difference between this black peak value and the black level. However, in a modification of this embodiment, it is also possible to use signal processing stages which determine the height of the black level separately and then carry out a subtraction with the black peak value detected in the picture contents of the video signal.

The arrangement according to FIG. 1 also includes an amplitude control device 21 for controlling the amplitude of the video signal before it is applied via the input 2 of the detection device 1. Such amplitude control devices for video signals are principally known and are also referred to as automatic gain control. In the embodiment of FIG. 1, the video signal from the input 20 is first applied via the clamping circuit 19 and then via the amplitude control device 21. However, it is alternatively possible to interchange the order in which the clamping circuit 19 and the amplitude control device 21 are arranged.

The blanking switch 15 in the detection device 1 ensures that exclusively the picture contents of the video signal are used for determining the black peak value in the detection stage 16. To this end, all synchronizing signals and possibly further signal components of the video signal which do not directly represent parts of the picture contents are blanked by blanking switch 15. The black levels (black porches), color synchronizing signals, data lines and the like also belong thereto. The blanking switch 15 is controlled via a line 22 of a blanking signal generator 23 which has a conventional structure.

The limiting circuit 4, arranged subsequent to the detection device 1 and being intended for limiting the shift of the level of the picture contents so as to avoid excessive changes of the picture impression, may be combined with the video signal expansion circuit 14 in a modification of the embodiment shown. In the embodiment shown according to FIG. 1, an arbitrary value for the difference between the black level in the video signal and the black peak value of the picture contents can be detected by the detection device 1 and supplied from the output 3. This difference value is limited in the subsequent limiting circuit 4 in such a way that a correction of the picture impression is possible and that a distorted picture impression is avoided. However, if the video signal expansion circuit 14 is formed with a transmission characteristic according to which the video signal is transmitted linearly only within the range of values predetermined by the limiting circuit 4, while only constant limit values are transmitted outside this range of values, the separate limiting circuit 4 may be dispensed with.

The level shifting device 6 of FIG. 1 has a stage 24 for generating a shift signal, in which stage a shift signal is generated from the signal supplied at the output 5 of the limiting circuit 4 for the detected difference between the black level and the black peak value, which shift signal is made available at the output 25 of the shifting signal generating stage 24. The shifting signal generating stage 24 is preferably implemented with an amplifier arrangement whose gain factor is determined in conformity with the transmission properties of the detection device 1 and the limiting circuit 4 in such a way that the shift signal at the output 25 corresponds to the value of the difference between the black level and the black peak value at the input 2 of the detection device 1. The shift signal is applied as a steering signal to the subtracting input 27 of a superposition stage 26. The video signal is applied to a positive input of the superposition stage 26 connected to the video signal input 10 of the level shifting device 6. The superposition stage 26 is implemented as a subtracter circuit in which the value of the steering signal is subtracted from the video signal. The black value-corrected video signal thus generated is supplied from an output of the superposition stage 26, which output is connected to the output 11 of the level shifting device 6.

For the subsequent correction of the amplitude of the picture contents of the black value-corrected video signal, the amplitude steering device 8 includes an amplitude steering signal generating stage 28 which also essentially comprises an amplifier arrangement. This stage converts the signal corresponding to the difference detected in the detection device 1 and applied via the input 9 of the amplitude steering device 8 into an amplitude steering signal which is derived via an output 29 of the amplitude steering signal generating stage 28 and applied to a control input 30 of an amplitude steering stage 31 also incorporated in the amplitude steering device 8 for the purpose of correcting the amplitude of the picture contents. The amplitude steering stage 31 is preferably implemented as a multiplier stage. A black value-corrected video signal from the video signal input 12 of the amplitude steering device 8 and the amplitude steering signal from the steering input 30 are multiplicatively combined in this stage and supplied as an amplitude-corrected video signal from the output 13 of the amplitude steering device 8. The gain factor of the amplitude steering signal generating stage 28 is again chosen to be such that—conditioned by the transmission behaviour of the detection device 1 and the limiting circuit 4—a correct multiplication factor of the difference just detected by the detection device 1 is generated.

Similarly as the clamping circuit 19 and the amplitude control device 21, the level shifting device 6 and the amplitude steering device 8, particularly the shifting signal generating stage 24 and the amplitude steering signal generating stage 28 therein may be connected to the blanking signal generator 23. The shift signal and the amplitude steering signal are effective via this connection only during the picture contents of the video signal, while the video signal can be transmitted in an unchanged form at the other time intervals.

Figure 2:
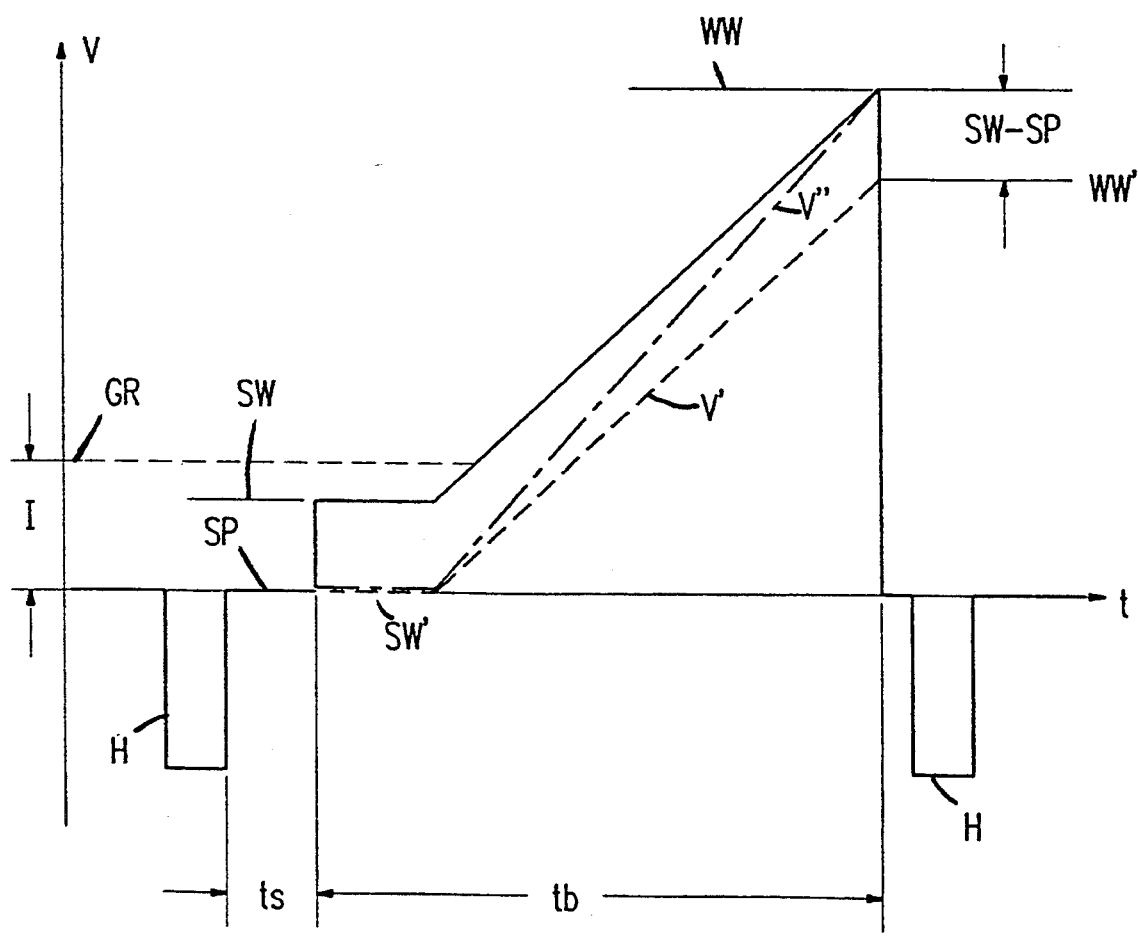
FIG. 2 shows a diagram to explain the operation of the circuit arrangement of FIG. 1.

FIG. 2 shows, by means of a roughly defined diagram the variation of a video signal V with respect to time t between two horizontal synchronizing pulses H for the example of the luminanee signal. In a time interval ts this signal has a fixed black level SP. The time interval ts is also referred to as black porch. In a further time interval tb the video signal V comprises the picture contents of one line of a video picture. To explain the mode of operation of the circuit arrangement according to the invention, a signal variation is chosen for the video signal V in the time interval tb, which variation initially assumes a constant value which corresponds to the black peak value SW of the picture contents of the video signal V and which subsequently increases linearly as far as the white peak value WW until the end of the time interval tb. It can be recognized that the black peak value SW detected in the picture contents of the video signal V exceeds the black level SP towards the white peak value WW. If a display tube fed with this video signal V is controlled in such a way that its cut-off point coincides with the black level SP, the picture components for which the video signal V assumes the black peak value SW are shown brighter than black on the display screen of the display tube. Moreover, the contrast of the picture displayed by means of this video signal V, which contrast is formed by the signal difference between the white peak value WW and the black peak value SW, is reduced as compared with an optimally adjusted contrast.

The level shifting device used in accordance with the invention initially shifts the level of the picture contents of the video signal V, i.e. the signal variation in the time interval tb by the difference between the black peak value SW and the black level SP towards the black level SP so that the black peak value SW' coincides with the black level SP. Consequently, a time variation, as represented by the broken line and referenced by the symbol V', results in the time interval tb for the picture contents of the video signal V. It can be seen that also the white peak value WW' is shifted at this variation V' by the difference between the black peak value SW and the black level SP, in other words it has been reduced.

To restore the original white peak value WW, i.e. to preserve the optimum picture contrast, an amplitude-corrected video signal is subsequently formed in accordance with the invention in the amplitude steering device (reference numeral 8 in FIG. 1), which video signal is shown in FIG. 2 within the time interval tb by means of a dot-and-dash line and by means of the reference symbol V". The amplitude-corrected video signal V" is corrected in amplitude in such a way that it has the black peak value SW' and the white peak value WW. In the display of the picture on the display tube the picture components assigned to the black peak value SW' are correctly displayed as black, whereas the picture components to be displayed as the brightest components are not darkened. An optimum picture display contrast is then achieved.

It is fundamentally possible to shift a black peak value SW of an arbitrary level towards the predetermined black level SP. However, this would mean that also video signals with an intentional bright picture content would be corrected accordingly, so that a distorted picture impression is the result. The range of values for the black peak value SW within which it is shifted towards the black level SP is therefore limited by a suitably chosen limit value GR towards the white peak value WW. This is also indicated by means of a broken line in FIG. 2. Moreover, since the picture contents of the video signal are to be shifted by the level shifting device (reference numeral 6 in FIG. 1 ) towards the black level SP only in those cases when the black peak value SW detected in the picture contents of the video signal V exceeds the black level SP towards the white peak value WW, the interval I, between which the black peak value SW is to occur so as to be shifted completely to the black level SP, is limited by the black level SP itself towards low values of the video signal V. If a black peak value SW exceeding the limit value GR occurs in the picture contents of the video signal V, the picture contents of the video signal V are only shifted by the difference GR-SP towards the black level SP. The darkest parts of the picture contents are then no longer displayed as black. In the opposite case, in which the detected black peak value SW is lower than the black level SP, the picture contents of the video signal V are preferably not shifted at all. An inadmissible brightening of the picture or a reduction of contrast is thereby avoided.

Since the information about the level shift and the amplitude correction is only gained from the position of the black peak value SW relative to the black level SP in the circuit arrangement according to the invention, signals of arbitrary picture contents can be processed so that disturbing effects in the display of the picture cannot occur. Particularly, video signals having a very dark picture content are not inadmissibly brightened, while video signals having a very bright picture content are neither inadmissibly darkened nor bloomed in brightness. The video signal obtained by means of the invention and corrected with reference to its black peak value and its amplitude is particularly suitable to be further processed without any problems in a gamma correction device such as is preferably used for display tube operation.

We claim:

1. A circuit arrangement for processing an input video signal (V) having a fixed black level (SP), a given white peak value (WW) as well as a black peak value (SW) dependent on the picture contents (during tb), comprising a detection device for detecting the difference between the fixed black level (SP) in the video signal (V) and the black peak value (SW) detected in the picture contents (during tb) of the video signal (V), a level shifting device for forming a black value-corrected video signal (V') by shifting the level of the picture contents of the video signal (V) by the detected difference towards the black level (SP), and an amplitude steering device for forming an amplitude-corrected video signal (V") by correcting the amplitude of the picture contents (during tb) of the black value-corrected video signal (V') in accordance with an amplitude steering signal obtained from the detected difference such that the amplitude-corrected video signal V" has the same predetermined white peak value (WW) as the input video signal (V).

2. A circuit arrangement as claimed in claim 1, characterized in that the picture contents of the input video signal (V) are shifted by the level shifting device (6) towards the black level (SP) only when the black peak value (SW) detected in the picture contents of the video signal (V) exceeds the black level (SP) towards the white peak value (WW).

3. A circuit arrangement as claimed in claim 1, characterized by a limiting circuit for supplying a limited difference value instead of the difference detected in the detection device, in so far as this difference exceeds a predeterminable limit value (GR).

4. A circuit arrangement as claimed in claim 1, characterized in that the detection device includes a memory for storing the value of the detected difference.

5. A circuit arrangement as claimed in claim 1, characterized in that the detection device comprises a black peak value detection stage.

6. A circuit arrangement as claimed in claim 1, characterized in that the detection device comprises a video signal expansion circuit by which a predeterminable range of video signal values is expanded for detecting the black peak value (SW).

7. A circuit arrangement as claimed in claim 1, characterized in that the level shifting device comprises a stage for generating a shift signal which is applied as a steering signal to a superposition stage for shifting the level of the picture contents of the input video signal (V) in the level shifting device.

8. A circuit arrangement as claimed in claim 1, characterized in that the amplitude steering device comprises a stage for generating the amplitude steering signal which is applied to an amplitude steering stage for correcting the amplitude of the picture contents.

9. A circuit arrangement as claimed in claim 1, characterized by an amplitude control device for controlling the amplitude of the input video signal (V) applied to the detection device.

10. A circuit arrangement as claimed in claim 1, characterized by a clamping circuit for clamping the fixed black level (SP) in the input video signal (V) applied to the detection device at a predeterminable value.

* * * * *